(12) United States Patent
Yang et al.

(10) Patent No.: US 10,009,083 B2
(45) Date of Patent: Jun. 26, 2018

(54) COMMUNICATION METHOD, BASE STATION, AND USER EQUIPMENT

(71) Applicant: Huawei Technologies Co., Ltd., Shenzhen (CN)

(72) Inventors: Jing Yang, Shanghai (CN); Jinlin Zhang, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 116 days.

(21) Appl. No.: 15/081,038

(22) Filed: Mar. 25, 2016

(65) Prior Publication Data

US 2016/0211899 A1  Jul. 21, 2016

Related U.S. Application Data

(63) Continuation of application No. PCT/CN2013/084423, filed on Sep. 27, 2013.

(51) Int. Cl.
| | |
|---|---|
| *H04B 7/06* | (2006.01) |
| *H04B 7/08* | (2006.01) |
| *H04B 17/318* | (2015.01) |
| *H04L 5/00* | (2006.01) |

(52) U.S. Cl.
CPC ......... *H04B 7/0617* (2013.01); *H04B 7/0695* (2013.01); *H04B 7/088* (2013.01); *H04B 17/318* (2015.01); *H04L 5/0048* (2013.01); *H04B 7/0619* (2013.01)

(58) Field of Classification Search
CPC .... H04B 7/0617; H04B 17/318; H04B 7/088; H04B 7/0695; H04B 7/0619; H04L 5/0048
See application file for complete search history.

(56) References Cited

U.S. PATENT DOCUMENTS

| | | | |
|---|---|---|---|
| 6,347,220 B1 * | 2/2002 | Tanaka | H01Q 1/246 370/320 |
| 9,706,533 B2 * | 7/2017 | Pajukoski | H04W 72/0413 |
| 2003/0231606 A1 | 12/2003 | Wu et al. | |
| 2005/0206564 A1 | 9/2005 | Mao et al. | |

(Continued)

FOREIGN PATENT DOCUMENTS

| | | |
|---|---|---|
| CN | 1399425 A | 2/2003 |
| CN | 101505205 A | 8/2009 |

(Continued)

*Primary Examiner* — Jay P Patel

(74) *Attorney, Agent, or Firm* — Leydig, Voit & Mayer, Ltd.

(57) ABSTRACT

A communication method, a base station, and user equipment are provided. The method includes: forming m beams by using a manner of antenna weighting, where m is a positive integer greater than 1; determining an uplink receive power of each beam according to an uplink sounding signal of UE; selecting n beams from the m beams according to the uplink receive power of each beam, where n is a positive integer, and n<m; and sending pilot signals to the UE by using the n beams. In the method, n beams are selected from the m beams according to the uplink receive power of each beam, to send pilot signals to the UE, instead of sending the pilot signals by using all the beams, thereby improving the flexibility of configuring the pilot signals for the UE, and reducing the complexity of measuring the pilot signals by the UE.

14 Claims, 5 Drawing Sheets

(56) References Cited

U.S. PATENT DOCUMENTS

| | | | |
|---|---|---|---|
| 2007/0109183 A1 | 5/2007 | Kimata | |
| 2007/0224987 A1* | 9/2007 | Ishii | H04W 16/28 455/436 |
| 2008/0095251 A1* | 4/2008 | Yeh | H04B 7/0634 375/260 |
| 2009/0196203 A1* | 8/2009 | Taira | H04B 7/0617 370/280 |
| 2009/0225728 A1 | 9/2009 | Tao et al. | |
| 2009/0279512 A1* | 11/2009 | Fujishima | H04B 7/0617 370/336 |
| 2010/0273499 A1 | 10/2010 | Van Rensburg et al. | |
| 2011/0255434 A1* | 10/2011 | Ylitalo | H01Q 1/246 370/252 |
| 2011/0279319 A1 | 11/2011 | Takano et al. | |
| 2013/0040684 A1 | 2/2013 | Yu et al. | |
| 2013/0072243 A1 | 3/2013 | Yu et al. | |
| 2013/0210424 A1* | 8/2013 | Boustie | H04B 7/18521 455/427 |
| 2015/0049824 A1 | 2/2015 | Kim et al. | |

FOREIGN PATENT DOCUMENTS

| | | |
|---|---|---|
| CN | 101729091 A | 6/2010 |
| CN | 101800581 A | 8/2010 |
| CN | 102223170 A | 10/2011 |
| CN | 102308612 A | 1/2012 |
| CN | 102484509 A | 5/2012 |
| EP | 2015467 A2 | 1/2009 |
| JP | 2001069054 A | 3/2001 |
| JP | 2003283404 A | 10/2003 |
| JP | 2007529955 A | 10/2007 |
| JP | 2010068519 A | 3/2010 |
| WO | WO 2010127026 A1 | 11/2010 |
| WO | WO 2012077615 A1 | 6/2012 |
| WO | WO 2013028023 A2 | 2/2013 |
| WO | WO 2013094980 A1 | 6/2013 |
| WO | WO 2013133645 A1 | 9/2013 |

\* cited by examiner

COMMUNICATION METHOD, BASE STATION, AND USER EQUIPMENT

CROSS-REFERENCE TO RELATED APPLICATIONS

This application is a continuation of International Patent Application No. PCT/CN2013/084423, filed on Sep. 27, 2013, which is hereby incorporated by reference in its entirety.

TECHNICAL FIELD

The present disclosure relates to the field of communications, and in particular, to a communication method, a base station, and user equipment.

BACKGROUND

Theoretical analyses indicate that, a channel capacity increases as the number of antennas increases. Further, a better beamforming effect can be obtained as the number of antennas at a transmit end increases. Therefore, a wireless transmission technology with more antennas for transmission and reception, that is, a Multiple-Input Multiple-Output (MIMO) technology, is always one of mainstream technologies studied in the field of mobile communications.

A reference signal, that is, a pilot signal, is a type of known signal provided by a base station to user equipment (UE) and used by the UE for channel estimation or channel measurement. Currently, a basic concept of pilot signal design is that each port corresponds to one pilot signal. For such a one-to-one mapping manner, each antenna omni-directionally transmits one pilot signal.

In the MIMO technology, the number of ports increases as the number of antennas increases. If an existing pilot signal design solution is adopted, the base station needs to send pilot signals to the UE by using all ports, resulting in poor flexibility when the base station configures the pilot signals for the UE. In addition, the UE also needs to measure pilot signals for all the ports, which increases the measurement complexity.

SUMMARY

Embodiments of the present disclosure provide a communication method, a base station, and user equipment, which can improve the flexibility of configuring pilot signals for UE, and can reduce the complexity of measuring the pilot signals by the UE.

According to a first aspect, a communication method is provided, including: forming m beams by using a manner of antenna weighting, where m is a positive integer greater than 1; determining an uplink receive power of each beam in the m beams according to an uplink sounding signal of user equipment (UE); selecting n beams from the m beams according to the uplink receive power of each beam in the m beams, where n is a positive integer, and n<m; and sending pilot signals to the UE by using the n beams.

With reference to the first aspect, in a first possible implementation manner, the selecting n beams from the m beams according to the uplink receive power of each beam in the m beams includes: selecting an optimal beam from the m beams, where an uplink receive power of the optimal beam is the greatest one in the m beams; and the sending pilot signals to the UE by using the n beams includes: sending the pilot signals to the UE by using the optimal beam.

With reference to the first possible implementation manner of the first aspect, in a second possible implementation manner, before the sending the pilot signals to the UE by using the optimal beam, the method further includes: sending first signaling to the UE, where the first signaling is used to indicate a pilot signal configuration corresponding to the optimal beam, and a start time and a transmission interval for sending the pilot signals, and the pilot signal configuration is used to indicate a time-frequency resource occupied by the pilot signals.

With reference to the second possible implementation manner of the first aspect, in a third possible implementation manner, after the sending the pilot signals to the UE by using the optimal beam, the method further includes: receiving first measurement information from the UE, where the first measurement information is obtained by the UE after the UE measures the pilot signals according to the first signaling; and sending data to the UE according to the first measurement information by using the optimal beam.

With reference to the third possible implementation manner of the first aspect, in a fourth possible implementation manner, the first measurement information includes a channel quality indicator (CQI); or the first measurement information includes the CQI and at least one of the following: a rank and a precoding matrix indicator (PMI).

With reference to the first aspect, in a fifth possible implementation manner, the selecting n beams from the m beams according to the uplink receive power of each beam in the m beams includes: determining a sum of uplink receive powers of beams in each of q groups of beams according to the uplink receive power of each beam in the m beams, where the q groups of beams are obtained by grouping the m beams, and each group of beams includes n beams; and selecting a group of beams from the q groups of beams, where a sum of uplink receive powers of beams in the selected group of beams is the greatest one in the q groups of beams.

With reference to the fifth possible implementation manner of the first aspect, in a sixth possible implementation manner, n beams in the selected group of beams are in a one-to-one correspondence to n types of pilot signal configurations, and the pilot signal configurations are separately used for time-frequency resources occupied by the pilot signals; and
the sending pilot signals to the UE by using the n beams includes: sending the pilot signals to the UE separately according to the n types of pilot signal configurations by using the n beams in the selected group of beams.

With reference to the sixth possible implementation manner of the first aspect, in a seventh possible implementation manner, before the sending the pilot signals to the UE separately according to the n types of pilot signal configurations by using the n beams in the selected group of beams, the method further includes: sending second signaling to the UE, where the second signaling is used to indicate the n types of pilot signal configurations, and a start time and a transmission interval for sending the pilot signals.

With reference to the seventh possible implementation manner of the first aspect, in an eighth possible implementation manner, after the sending the pilot signals to the UE separately according to the n types of pilot signal configurations by using the n beams in the selected group of beams, the method further includes: receiving second measurement information from the UE, where the second measurement information includes n measurement results obtained by the UE after the UE measures the pilot signals according to the second signaling; determining, according to the selected group of beams and the second measurement information, a data transmission beam corresponding to the UE; and sending data to the UE by using the data transmission beam.

With reference to the eighth possible implementation manner of the first aspect, in a ninth possible implementation manner, the determining, according to the selected group of beams and the second measurement information, a data transmission beam corresponding to the UE includes: determining spectral efficiencies separately corresponding to the n measurement results; determining an optimal measurement result in the n measurement results according to the spectral efficiencies separately corresponding to the n measurement results, where a spectral efficiency corresponding to the optimal measurement result in the n measurement results is the greatest; and determining the data transmission beam according to the optimal measurement result and the selected group of beams.

With reference to the eighth possible implementation manner or the ninth possible implementation manner of the first aspect, in a tenth possible implementation manner, each measurement result in the n measurement results includes a channel quality indicator (CQI); or each measurement result includes the CQI and at least one of the following: a rank and a precoding matrix indicator (PMI).

With reference to the first aspect or any manner of the first possible implementation manner to the tenth possible implementation manner of the first aspect, in an eleventh possible implementation manner, the pilot signals are channel state information-reference signals (CSI-RSs).

According to a second aspect, a communication method is provided, including: receiving pilot signals that are sent by a base station by using n beams, where the n beams are selected by the base station from m formed beams according to an uplink receive power of each beam in the m beams, m is a positive integer greater than 1, n is a positive integer, and n<m; and measuring the pilot signals.

With reference to the second aspect, in a first possible implementation manner, the receiving pilot signals that are sent by a base station by using n beams includes: receiving the pilot signals that are sent by the base station by using an optimal beam, where an uplink receive power of the optimal beam is the greatest one in the m beams.

With reference to the first possible implementation manner of the second aspect, in a second possible implementation manner, before the receiving the pilot signals that are sent by the base station by using an optimal beam, the method further includes: receiving first signaling sent by the base station, where the first signaling is used to indicate a pilot signal configuration corresponding to the optimal beam, and a start time and a transmission interval for sending the pilot signals, and the pilot signal configuration is used to indicate a time-frequency resource occupied by the pilot signals, where
the measuring the pilot signals includes: measuring the pilot signals according to the first signaling, to obtain first measurement information.

With reference to the second possible implementation manner of the second aspect, in a third possible implementation manner, the method further includes: sending the first measurement information to the base station; and receiving data that is sent by the base station according to the first measurement information by using the optimal beam.

With reference to the second possible implementation manner or the third possible implementation manner of the second aspect, in a fourth possible implementation manner, the first measurement information includes a channel quality indicator (CQI); or the first measurement information includes the CQI and at least one of the following: a rank and a precoding matrix indicator (PMI).

With reference to the second aspect, in a fifth possible implementation manner, the receiving pilot signals that are sent by a base station by using n beams includes: receiving the pilot signals that are sent by the base station separately by using n beams in a group of beams, where the group of beams is selected from q groups of beams that are obtained by the base station by grouping the m beams, each group of beams includes n beams, and a sum of uplink receive powers of beams in each of the q groups of beams is the greatest.

With reference to the fifth possible implementation manner of the second aspect, in a sixth possible implementation manner, n beams in the group of beams are in a one-to-one correspondence to n types of pilot signal configurations, and the pilot signal configurations are used to indicate time-frequency resources occupied by the pilot signals; and the receiving the pilot signals that are sent by the base station by using n beams in a group of beams includes: receiving the pilot signals that are sent by the base station separately according to the n types of pilot configurations by using the n beams in the group of beams.

With reference to the sixth possible implementation manner of the second aspect, in a seventh possible implementation manner, before the receiving the pilot signals that are sent by the base station separately according to the n types of pilot configurations by using the n beams in the group of beams, the method includes: receiving second signaling sent by the base station, where the second signaling is used to indicate the n types of pilot signal configurations, and a start time and a transmission interval for sending the pilot signals, where
the measuring the pilot signals includes: measuring the pilot signals according to the second signaling, to obtain n measurement results.

With reference to the seventh possible implementation manner of the second aspect, in an eighth possible implementation manner, the method further includes: sending second measurement information to the base station, where the second measurement information includes the n measurement results; and receiving data that is sent by the base station by using a data transmission beam, where the data transmission beam is determined by the base station according to the group of beams and the second measurement information.

With reference to the seventh possible implementation manner or the eighth possible implementation manner of the second aspect, in a ninth possible implementation manner, each measurement result in the n measurement results includes a channel quality indicator (CQI); or each measurement result includes the CQI and at least one of the following: a rank and a precoding matrix indicator (PMI).

With reference to the second aspect or any manner of the first possible implementation manner to the ninth possible implementation manner of the second aspect, in a tenth possible implementation manner, the pilot signals are channel state information-reference signals (CSI-RSs).

According to a third aspect, a base station is provided, including: a weighting unit, configured to form m beams by using a manner of antenna weighting, where m is a positive integer greater than 1; a first determining unit, configured to determine an uplink receive power of each beam in the m beams according to an uplink sounding signal of user equipment (UE); a selecting unit, configured to select n beams from the m beams according to the uplink receive power of each beam in the m beams, where n is a positive integer, and n<m; and a sending unit, configured to send pilot signals to the UE by using the n beams.

With reference to the third aspect, in a first possible implementation manner, the selecting unit is configured to select an optimal beam from the m beams, where an uplink receive power of the optimal beam is the greatest one in the m beams; and the sending unit is configured to send the pilot signals to the UE by using the optimal beam.

With reference to the first possible implementation manner of the third aspect, in a second possible implementation manner, the sending unit is further configured to: before sending the pilot signals to the UE by using the optimal beam, send first signaling to the UE, where the first signaling is used to indicate a pilot signal configuration corresponding to the optimal beam, and a start time and a transmission interval for sending the pilot signals, and the pilot signal configuration is used to indicate a time-frequency resource occupied by the pilot signals.

With reference to the second possible implementation manner of the third aspect, in a third possible implementation manner, the base station further includes a first receiving unit, where the first receiving unit is configured to receive first measurement information from the UE after the sending unit sends the pilot signals to the UE by using the optimal beam, where the first measurement information is obtained by the UE after the UE measures the pilot signals according to the first signaling; and the sending unit is further configured to send data to the UE according to the first measurement information by using the optimal beam.

With reference to the third aspect, in a fourth possible implementation manner, the selecting unit is configured to determine a sum of uplink receive powers of beams in each of q groups of beams according to the uplink receive power of each beam in the m beams, where the q groups of beams are obtained by grouping the m beams, and each group of beams includes n beams; and select a group of beams from the q groups of beams, where a sum of uplink receive powers of beams in the selected group of beams is the greatest one in the q groups of beams.

With reference to the fourth possible implementation manner of the third aspect, in a fifth possible implementation manner, n beams in the selected group of beams are in a one-to-one correspondence to n types of pilot signal configurations, and the pilot signal configurations are separately used for time-frequency resources occupied by the pilot signals; and the sending unit is configured to send the pilot signals to the UE separately according to the n types of pilot signal configurations by using the n beams in the selected group of beams.

With reference to the fifth possible implementation manner of the third aspect, in a sixth possible implementation manner, the sending unit is further configured to: before sending the pilot signals to the UE separately according to the n types of pilot signal configurations by using the n beams in the selected group of beams, send second signaling to the UE, where the second signaling is used to indicate the n types of pilot signal configurations, and a start time and a transmission interval for sending the pilot signals.

With reference to the sixth possible implementation manner of the third aspect, in a seventh possible implementation manner, the base station further includes a second receiving unit and a second determining unit, where the second receiving unit is configured to: after the sending unit sends the pilot signals to the UE separately according to the n types of pilot signal configurations by using the n beams in the selected group of beams, receive second measurement information from the UE, where the second measurement information includes n measurement results obtained by the UE after the UE measures the pilot signals according to the second signaling; the second determining unit is further configured to determine, according to the selected group of beams and the second measurement information, a data transmission beam corresponding to the UE; and the sending unit is further configured to send data to the UE by using the data transmission beam.

With reference to the seventh possible implementation manner of the third aspect, in an eighth possible implementation manner, the second determining unit is configured to determine spectral efficiencies separately corresponding to the n measurement results; determine an optimal measurement result in the n measurement results according to the spectral efficiencies separately corresponding to the n measurement results, where a spectral efficiency corresponding to the optimal measurement result in the n measurement results is the greatest; and determine the data transmission beam according to the optimal measurement result and the selected group of beams.

According to a fourth aspect, user equipment is provided, including: a receiving unit, configured to receive pilot signals that are sent by a base station by using n beams, where the n beams are selected by the base station from m formed beams according to an uplink receive power of each beam in the m beams, m is a positive integer greater than 1, n is a positive integer, and n<m; and a measuring unit, configured to measure the pilot signals.

With reference to the fourth aspect, in a first possible implementation manner, the receiving unit is configured to receive the pilot signals that are sent by the base station by using an optimal beam, where an uplink receive power of the optimal beam is the greatest one in the m beams.

With reference to the first possible implementation manner of the fourth aspect, in a second possible implementation manner, the receiving unit is further configured to: before the receiving the pilot signals that are sent by the base station by using an optimal beam, receive first signaling sent by the base station, where the first signaling is used to indicate a pilot signal configuration corresponding to the optimal beam, and a start time and a transmission interval for sending the pilot signals, and the pilot signal configuration is used to indicate a time-frequency resource occupied by the pilot signals; and the measuring unit is configured to measure the pilot signals according to the first signaling, to obtain first measurement information.

With reference to the second possible implementation manner of the fourth aspect, in a third possible implementation manner, the user equipment further includes a sending unit, where the sending unit is configured to send the first measurement information to the base station; and the receiving unit is further configured to receive data that is sent by the base station according to the first measurement information by using the optimal beam.

With reference to the fourth aspect, in a fourth possible implementation manner, the receiving unit is configured to receive the pilot signals that are sent by the base station separately by using n beams in a group of beams, where the group of beams is selected from q groups of beams that are obtained by the base station by grouping the m beams, each group of beams includes n beams, and a sum of uplink receive powers of beams in each of in the q groups of beams is the greatest.

With reference to the fourth possible implementation manner of the fourth aspect, in a fifth possible implementation manner, n beams in the group of beams are in a one-to-one correspondence to n types of pilot signal configurations, and the pilot signal configurations are used to indicate time-frequency resources occupied by the pilot signals; and the receiving unit is configured to receive the pilot signals that are sent by the base station separately according to the n types of pilot configurations by using the n beams in the group of beams.

With reference to the fifth possible implementation manner of the fourth aspect, in a sixth possible implementation manner, the receiving unit is further configured to: before the receiving the pilot signals that are sent by the base station separately according to the n types of pilot configurations by using the n beams in the group of beams, receive second signaling sent by the base station, where the second signaling is used to indicate the n types of pilot signal configurations, and a start time and a transmission interval for sending the pilot signals; and the measuring unit is configured to measure the pilot signals according to the second signaling, to obtain n measurement results.

With reference to the sixth possible implementation manner of the fourth aspect, in a seventh possible implementation manner, the user equipment further includes a sending unit, where the sending unit is configured to send second measurement information to the base station, where the second measurement information includes the n measurement results; and the receiving unit is further configured to receive data that is sent by the base station by using a data transmission beam, where the data transmission beam is determined by the base station according to the group of beams and the second measurement information.

In the embodiments of the present disclosure, an uplink receive power of each beam in m beams is determined according to an uplink sounding signal of UE, and n beams are selected from the m beams according to the uplink receive power of each beam in the m beams, to send pilot signals to the UE, instead of sending the pilot signals to the UE by using all the beams, thereby improving the flexibility of configuring the pilot signals for the UE, and reducing the complexity of measuring the pilot signals by the UE.

BRIEF DESCRIPTION OF DRAWINGS

To describe the technical solutions in the embodiments of the present disclosure more clearly, the following briefly introduces the accompanying drawings required for describing the embodiments of the present disclosure. Apparently, the accompanying drawings in the following description show merely some embodiments of the present disclosure, and a person of ordinary skill in the art may still derive other drawings from these accompanying drawings without creative efforts.

DESCRIPTION OF EMBODIMENTS

The following clearly and completely describes the technical solutions in the embodiments of the present disclosure with reference to the accompanying drawings in the embodiments of the present disclosure. Apparently, the described embodiments are a part rather than all of the embodiments of the present disclosure. All other embodiments obtained by a person of ordinary skill in the art based on the embodiments of the present disclosure without creative efforts shall fall within the protection scope of the present disclosure.

The technical solutions of the present disclosure may be applied to various communications systems, such as: a Global System for Mobile Communications (GSM), a Code Division Multiple Access (CDMA) system, Wideband Code Division Multiple Access (WCDMA), a General Packet Radio Service (GPRS), and Long Term Evolution (LTE).

User equipment (UE) may also be referred to as a mobile terminal (MT), mobile user equipment, or the like. The user equipment may communicate with one or more core networks via a radio access network (RAN). The user equipment may be a mobile terminal, such as a mobile phone (or referred to as a "cellular" phone), or a computer having a mobile terminal, for example, it may be a portable, pocket-sized, handheld, computer built-in, or vehicle-mounted mobile apparatus.

The base station may be a base station (Base Transceiver Station, BTS) in the GSM or CDMA, may also be a base station (NodeB) in the WCDMA, and may further be an evolved base station (evolved Node B, eNB or e-NodeB) in the LTE, which is not limited in the present disclosure.

Figure 1:
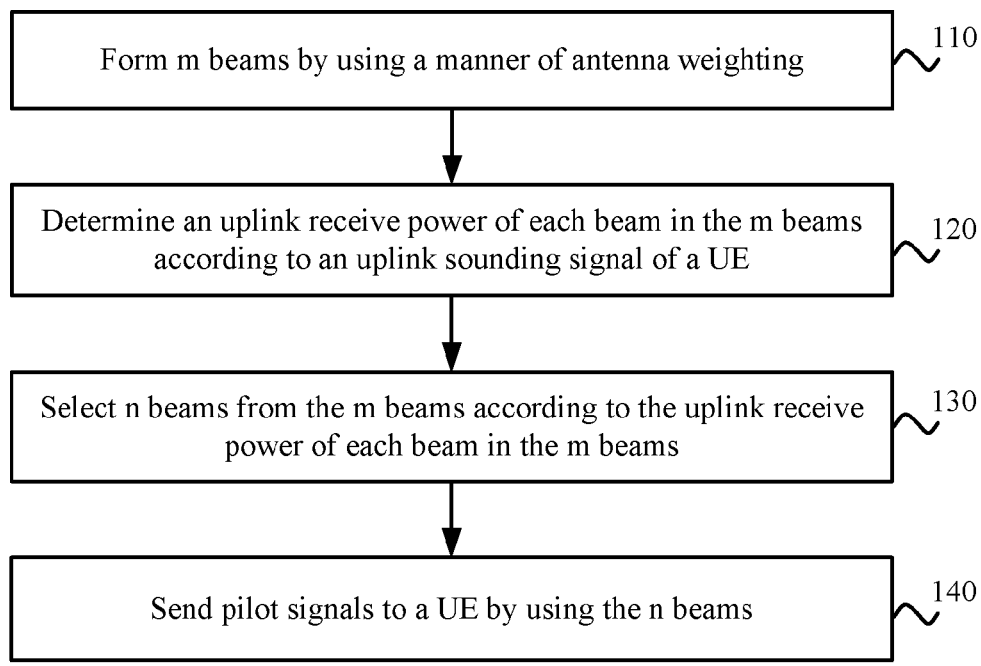
FIG. 1 is a schematic flowchart of a communication method according to an embodiment of the present disclosure.

FIG. 1 is a schematic flowchart of a communication method according to an embodiment of the present disclosure. The method in FIG. 1 is executed by a base station.

110: Form m beams by using a manner of antenna weighting, where m is a positive integer greater than 1.

For example, in an active antenna system (AAS), the base station may form m beams with different directions by using the manner of antenna weighting.

Each beam may correspond to one or more ports. For example, in a situation in which an antenna is a single polarization antenna, each beam may correspond to 1 port, and then the m beams may correspond to m ports. In a situation in which an antenna is a cross polarization antenna, each beam may correspond to 2 ports, and then the m beams may correspond to m×2 ports.

120: Determine an uplink receive power of each beam in the m beams according to an uplink sounding signal of UE.

For example, the base station may receive the uplink sounding signal of the UE through a port corresponding to each beam, and determine the uplink receive power of the beam according to the uplink sounding signal received through the port corresponding to each beam.

130: Select n beams from the m beams according to the uplink receive power of each beam in the m beams, where n is a positive integer, and n<m.

For example, the base station may select n beams from the m beams by comparing values of the uplink receive powers of the beams.

140: Send pilot signals to the UE by using the n beams.

The base station may send the pilot signals to the UE by using ports separately corresponding to the n beams.

If an existing pilot signal design solution is adopted, that is, a pilot signal is mapped on each port, a base station needs to send pilot signals to UE by using all ports corresponding to m beams, resulting in poor flexibility when the base station configures the pilot signals for the UE. Correspondingly, it is necessary for the UE to measure the pilot signals that are sent by using all the ports of the m beams, and the measurement complexity is high. However, in the embodiment of the present disclosure, the base station determines a uplink receive power of each of the m beams according to the uplink sounding signal of the UE, and selects ports separately corresponding to the n beams in the m beams according to the uplink receive powers of the m beams, to send the pilot signals to the UE, thereby substantially improving the flexibility of configuring the pilot signals for the UE by the base station. Further, since n is less than m, it is unnecessary for the UE to measure the pilot signals that are sent on all the beams, thereby reducing the measurement complexity.

In the embodiment of the present disclosure, an uplink receive power of each beam in m beams is determined according to an uplink sounding signal of UE, and n beams are selected from the m beams according to the uplink receive power of each beam in the m beams, to send pilot signals to the UE, instead of sending the pilot signals to the UE by using all the beams, thereby improving the flexibility of configuring the pilot signals for the UE, and reducing the complexity of measuring the pilot signals by the UE.

In addition, for a large-scale antenna system, for example, when the number of the ports corresponding to the m beams is greater than 8, an existing pilot signal design solution cannot support so many ports. Therefore, in the embodiment of the present disclosure, the n beams are selected from the m beams according to the uplink receive power of each beam in the m beams, and the pilot signals are sent to the UE by using the n beams, instead of sending the pilot signals to the UE by using all the beams, thereby implementing pilot signal transmission in the large-scale antenna system.

The foregoing pilot signals may be pilot signals only used for channel measurement. For this type of pilot signals, it is unnecessary for the base station to omni-directionally send the pilot signals, and therefore the pilot signals can be sent by using one or more of the beams. Optionally, as an embodiment, the pilot signals may be channel state information-reference signals (CSI-RS).

Optionally, as another embodiment, in step 120, the base station may obtain the uplink receive power of each beam after a period of time of statistics collection. For example, the base station may set a time-domain counter, and collect statistics on the uplink receive power of each beam in a window length for time-domain filtering. The uplink receive power of each beam may be replaced by an average uplink receive power of each beam.

The base station may determine the average uplink receive power of each beam according to the following steps:

A) The base station may receive the uplink sounding signal of the UE by using all the ports corresponding to the m beams. The base station may perform channel estimation for each port based on the uplink sounding signal, and determine a channel coefficient corresponding to each port and on a subcarrier. For example, for a $j^{th}$ port corresponding to an $i^{th}$ beam in the m beams, a channel coefficient obtained by estimation on a subcarrier k may be $h_{i,j,k}$.

B) The base station may calculate an average power of the channel coefficient of each beam at all the ports and on all subcarriers.

For example, an average uplink receive power of the $i^{th}$ beam is $$|h|^2_{i,avg} = \frac{1}{N_{port} * N_{subcarr}} \sum_{k=1}^{N_{subcarr}} \sum_{j=1}^{N_{port}} |h_{i,j,k}|,$$

where $N_{port}$ may represent the number of all the ports corresponding to the m beams; and $N_{subcarr}$ may represent the number of all the subcarriers.

C) The base station may filter the average uplink receive power of each beam in a time domain. Correspondingly, the time-domain counter is added by 1.

D) The base station may determine whether the time-domain counter reaches the window length for time-domain filtering. If the time-domain counter does not reach the window length for time-domain filtering, the base station returns to execute the foregoing step A).

If the time-domain counter reaches the window length for time-domain filtering, average uplink receive powers of the m beams in the period of time may be respectively used as the uplink receive powers of the m beams for processing in step 130.

The base station may select one or more beams from the m beams based on the uplink receive powers of the m beams, to send pilot signals to the UE. A process that the base station selects one beam from the m beams to send pilot signals to the UE is described in detail below.

Optionally, as another embodiment, in step 130, the base station selects an optimal beam from the m beams, where an uplink receive power of the optimal beam is the greatest one in the m beams. Correspondingly, in step 140, the base station may send the pilot signals to the UE by using the optimal beam.

The base station may select a beam with the greatest uplink receive power from the m beams as the optimal beam. For example, the base station may compare average uplink receive powers of the m beams, so as to select an optimal beam with the greatest average uplink receive power. Then, the base station sends the pilot signals to the UE by using the optimal beam. As can be seen, in this embodiment, the base station sends the pilot signals to the UE by using one beam in the m beams, instead of sending the pilot signals by using all the beams, thereby reducing the overhead of the pilot signals.

Optionally, as another embodiment, before sending the pilot signals to the UE by using the optimal beam, the base station may send first signaling to the UE, where the first signaling is used to indicate a pilot signal configuration corresponding to the optimal beam, and a start time and a transmission interval for sending the pilot signals, and the pilot signal configuration is used to indicate time-frequency resources occupied by the pilot signals.

In order to enable each UE served by the base station to distinguish the beams, the base station may use different pilot signal configurations on the beams separately to send the pilot signals. The pilot signal configuration indicates time-frequency resources occupied by the pilot signals. Therefore, pilot signals that are sent by the base station by using a beam occupy time-frequency resources different from time-frequency resources occupied by pilot signals that are sent by using another beam.

However, the number of pilot signal configurations supported by each subframe is limited. When m is greater than the number of pilot signal configurations supported by each subframe, different subframes are used to distinguish pilot signal configurations corresponding to the beams, so as to ensure that pilot signal configurations corresponding to the beams are different from each other. For example, in a current standard, for a situation in which each beam corresponds to 2 ports, each subframe supports at most 20 types of CSI-RS configurations. When m is greater than 20, for example, m is 24, the base station may separately send CSI-RSs on 2 subframes by using 24 beams. For example, it is assumed that the transmission interval of the pilot signals is 10 ms, and usually 1 subframe is 1 ms, that is, the transmission interval of the pilot signals is 10 subframes. As described above, the pilot signals may be sent by using 2 subframes in each interval, and then subframes for sending the pilot signals may be subframes 1, 2, 11, 12, 21, 22, and so on. In the first interval, the base station may send the CSI-RSs on the subframe 1 by using 20 beams, and send the CSI-RSs on the subframe 2 by using remaining 4 beams. In a next interval, the base station may send the CSI-RSs on the subframe 11 by using 20 beams, and send the CSI-RSs on the subframe 12 by using 4 beams, and so on.

Before sending the pilot signals to the UE, the base station needs to notify the UE of the time-frequency resources occupied by the pilot signals, and the start time and the transmission interval for sending the pilot signals. The base station may use the first signaling to indicate, to the UE, the pilot signal configuration corresponding to the optimal beam, and the start time and the transmission interval for sending the pilot signals. The first signaling may be high-layer signaling. In this way, the UE may measure the pilot signals on the time-frequency resources indicated by the pilot signal configuration from the foregoing start time according to the transmission interval.

Optionally, as another embodiment, the base station may further receive first measurement information from the UE after sending the pilot signals to the UE by using the optimal beam, where the first measurement information is obtained by the UE after the UE measures the pilot signals according to the first signaling. Then, the base station may send data to the UE according to the first measurement information by using the optimal beam.

The base station may use the optimal beam as a data transmission beam corresponding to the UE, and send the data to the UE based on the first measurement information by using the optimal beam.

Optionally, as another embodiment, the first measurement information may include a channel quality indicator (CQI).

Optionally, as another embodiment, the first measurement information may include the CQI and at least one of the following: a rank and a precoding matrix indicator (PMI). For example, the UE may determine, according to a transmission mode, whether to enable the measurement information to include the rank or the PMI.

In the foregoing descriptions, the base station selects one beam from the m beams to send the pilot signals to the UE. In addition, the base station may also select multiple beams from the m beams to send the pilot signals to the UE, and the process is described in detail below.

Optionally, as another embodiment, in step 130, the base station may determine a sum of uplink receive powers of beams in each of q groups of beams according to the uplink receive power of each beam in the m beams, where the q groups of beams are obtained by grouping the m beams, and each group of beams includes n beams. The base station may select a group of beams from the q groups of beams, where a sum of uplink receive powers of beams in the selected group of beams is the greatest one in the q groups of beams.

The base station may group the m beams into q groups of beams, where each group of beams includes n beams. The base station may group the beams according to directions of the beams, to make space intervals between the groups be large enough. The space intervals between the groups may be determined according to an actual requirement, for example, may be determined according to transmission performance and overhead of the pilot signals.

The base station may calculate the sum of uplink receive powers of beams in each of the q groups of beams. For example, the base station may sum average uplink receive powers of the n beams in each group of beams, to obtain the sum of uplink receive powers of beams in each group. The base station may compare the sums of uplink receive powers of the groups of beams, and select a group of beams with the greatest sum of uplink receive powers. As can be seen, the base station selects one group of beams from the groups of beams, to send the pilot signals to the UE, instead of sending the pilot signals by using all the beams, thereby saving the overhead of the pilot signals.

Optionally, as another embodiment, n beams in the selected group of beams are in a one-to-one correspondence to n types of pilot signal configurations, and the n types of pilot signal configurations are separately used to indicate time-frequency resources occupied by the pilot signals. In step 140, the base station may send the pilot signals to the UE separately according to the n types of pilot signal configurations by using the n beams in the selected group of beams.

The base station may send n types of pilot signals to the UE by using the n beams in this group of beams separately on time-frequency resources indicated by the n types of pilot signal configurations.

Optionally, as another embodiment, before sending the pilot signals to the UE separately according to the n types of pilot signal configurations by using the n beams in the selected group of beams, the base station may send second signaling to the UE, where the second signaling may be used to indicate the n types of pilot signal configurations, and a start time and a transmission interval for sending the pilot signals.

In order to enable each UE served by the base station to distinguish the beams, the base station may use different pilot signal configurations on the beams separately to send the pilot signals. The pilot signal configuration indicates time-frequency resources occupied by the pilot signals. Therefore, pilot signals that are sent by the base station by using a beam occupy time-frequency resources different from time-frequency resources occupied by pilot signals that are sent by using another beam.

However, the number of pilot signal configurations supported by each subframe is limited. When m is greater than the number of pilot signal configurations supported by each subframe, different subframes are used to distinguish pilot signal configurations corresponding to the beams, so as to ensure that pilot signal configurations corresponding to the beams are different from each other. For example, in a current standard, for a situation in which each beam corresponds to 2 ports, each subframe supports at most 20 types of CSI-RS configurations. When m is greater than 20, for example, m is 24, it is assumed that 24 beams are grouped into 4 groups, the base station may send CSI-RSs separately on 2 subframes by using the 4 groups of beams. For example, it is assumed that an interval for sending the pilot signals is 10 ms, that is, 10 subframes. The pilot signals may be sent by using 2 subframes in each interval. Then, subframes for sending the pilot signals may be subframes 1, 2, 11, 12, 21, 22, and so on. In the first interval, the base station may send the CSI-RSs on the subframe 1 by using the first group and the second group of beams, and send the CSI-RSs on the subframe 2 by using the third group and the fourth group of beams. In a next interval, the base station may send the CSI-RSs on the subframe 11 by using the first group and the second group of beams, and send the CSI-RSs on the subframe 12 by using the third group and the fourth group of beams, and so on.

Before sending the pilot signals, the base station needs to notify the UE of the time-frequency resources occupied by each type of pilot signal, and the start time and the transmission interval for sending the pilot signals. The base station may use the second signaling to indicate, to the UE, the n types of pilot signal configurations, the start time and the transmission interval. In this way, the UE may measure the pilot signals on the time-frequency resources separately indicated by the n types of pilot signal configurations from the start time according to the transmission interval. The second signaling may be high-layer signaling.

Optionally, as another embodiment, after sending the pilot signals to the UE according to the n types of pilot signal configurations by using the n beams in the selected group of beams, the base station may receive second measurement information from the UE, where the second measurement information includes n measurement results obtained by the UE after the UE measures the pilot signals on the time-frequency resources indicated by the n types of pilot signal configurations. The base station may determine, according to the selected group of beams and the second measurement information, a data transmission beam corresponding to the UE. Then, the base station may send data to the UE by using the data transmission beam.

The time-frequency resources separately indicated by the n types of pilot signal configurations are mutually staggered, and therefore, the UE may measure the pilot signals on the time-frequency resources separately indicated by the n types of pilot signal configurations, and correspondingly obtain n measurement results.

Optionally, as another embodiment, the base station may determine spectral efficiencies, which are reported by the UE and separately correspond to the n measurement results. The base station may determine an optimal measurement result in the n measurement results according to the spectral efficiencies separately corresponding to the n measurement results, where a spectral efficiency corresponding to the optimal measurement result is the greatest one in the n measurement results. Then, the base station may determine the data transmission beam according to the optimal measurement result and the selected group of beams.

Optionally, as another embodiment, each measurement result in the n measurement results may include a CQI. Alternatively, each measurement result may include the CQI and at least one of the following: a rank and a PMI.

The base station may calculate the spectral efficiencies separately corresponding to the n measurement results according to CQIs and ranks in the n measurement results reported by the UE. If the measurement result does not include the rank, and then the base station may set the rank to rank1 by default, so as to obtain the spectral efficiency corresponding to each measurement result. The base station may select a corresponding optimal measurement result with the greatest spectral efficiency from the n measurement results. Since each measurement result corresponds to one type of pilot signal configuration, and the pilot signal configurations are in a one-to-one correspondence to the beams, each measurement result corresponds to one beam. When the optimal measurement result is determined, a beam corresponding to the optimal measurement result may be determined in the foregoing selected group of beams as the data transmission beam, to send the data to the UE.

Figure 2:
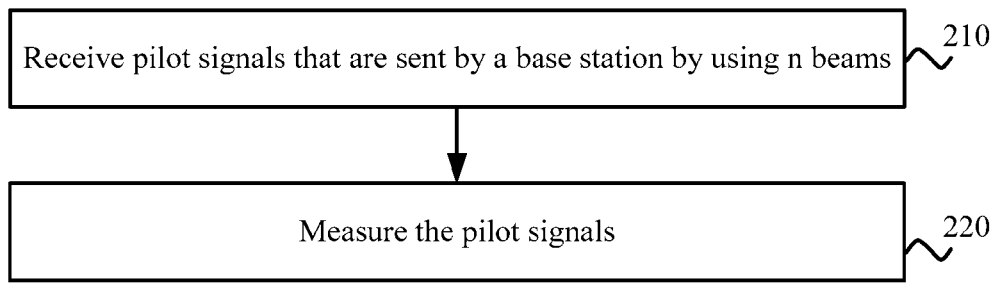
FIG. 2 is a schematic flowchart of a communication method according to another embodiment of the present disclosure.

FIG. 2 is a schematic flowchart of a communication method according to another embodiment of the present disclosure. The method in FIG. 2 is executed by UE.

210: Receive pilot signals that are sent by a base station by using n beams, where the n beams are selected by the base station from m formed beams according to an uplink receive power of each beam in the m beams, m is a positive integer greater than 1, n is a positive integer, and n<m.

220: Measure the pilot signals.

In the embodiment of the present disclosure, pilot signals that are sent by a base station by using n beams are measured, and the n beams are selected from m beams, thereby reducing the measurement complexity. Further, the base station sends the pilot signals by using the n beams in the m beams, which can improve the flexibility of configuring the pilot signals for UE.

Optionally, as an embodiment, the foregoing pilot signals may be CSI-RSs.

Optionally, as another embodiment, in step 210, the UE may receive the pilot signals that are sent by the base station by using an optimal beam, where an uplink receive power of the optimal beam is the greatest one in the m beams.

Optionally, as another embodiment, before receiving the pilot signals that are sent by the base station by using the optimal beam, the UE may receive first signaling sent by the base station, where the first signaling is used to indicate a pilot signal configuration corresponding to the optimal beam, and a start time and a transmission interval for sending the pilot signals, and the pilot signal configuration is used to indicate time-frequency resources occupied by the pilot signals. In step 220, the UE may measure the pilot signals according to the first signaling, to obtain first measurement information.

The UE may measure the pilot signals on the time-frequency resources indicated by the pilot signal configuration corresponding to the optimal beam from the foregoing start time according to the transmission interval, so as to obtain corresponding measurement information.

Optionally, as another embodiment, after step 220, the UE may send the first measurement information to the base station, and may receive data that is sent by the base station according to the first measurement information by using the optimal beam.

Optionally, as another embodiment, the first measurement information may include a CQI. Alternatively, the first measurement information may include the CQI and at least one of the following: a rank and a PMI.

A process that the UE receives the pilot signals that are sent by the base station by using one beam is described above, and a process of measuring and receiving data is also described. The following describes a process that the UE receives pilot signals that are sent by the base station by using multiple beams, and describes a corresponding process of measuring and receiving data.

Optionally, as another embodiment, in step 210, the UE may receive the pilot signals that are sent by the base station separately by using n beams in a group of beams, where the foregoing group of beams is selected from q groups of beams that are obtained by the base station by grouping the m beams, each group of beams includes n beams, and a sum of uplink receive powers of beams in the group of beams is the greatest one in the q groups of beams.

Optionally, as another embodiment, n beams in the foregoing group of beams are in a one-to-one correspondence to n types of pilot signal configurations, and the pilot signal configurations are used to indicate time-frequency resources occupied by the pilot signals. The UE may receive the pilot signals that are sent by the base station separately according to the n types of pilot configurations by using the n beams in the group of beams.

The base station may send n types of pilot signals to the UE separately by using the n beams on the time-frequency resources indicated by the n types of pilot signal configurations.

Optionally, as another embodiment, before receiving the pilot signals that are sent by the base station separately according to the n types of pilot signal configurations by using the n beams in the group of beams, the UE may receive second signaling sent by the base station, where the second signaling is used to indicate the n types of pilot signal configurations, and a start time and a transmission interval for sending the pilot signals.

In step 220, the UE may measure the pilot signals according to the second signaling, to obtain n measurement results.

The UE may measure the pilot signals on the time-frequency resources separately indicated by the n types of pilot signal configurations from the foregoing start time according to the transmission interval.

Optionally, as another embodiment, the UE may send second measurement information to the base station, where the second measurement information includes the n measurement results, and may receive data that is sent by the base station by using a data transmission beam, where the data transmission beam is determined by the base station according to the group of beams and the second measurement information.

Embodiments of the present disclosure are introduced in detail below with reference to a specific example. It should be noted that, the following example is merely for helping a person skilled in the art understand the embodiments of the present disclosure in a better way, rather than limiting the scope of the embodiments of the present disclosure.

Figure 3:
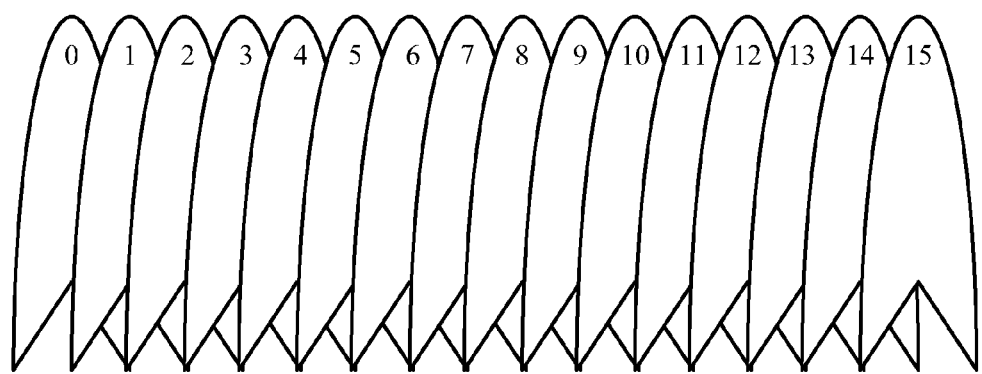
FIG. 3 is a schematic diagram of an example of a scenario to which an embodiment of the present disclosure is applicable.

FIG. 3 is a schematic diagram of an example of a scenario to which an embodiment of the present disclosure is applicable.

In FIG. 3, it is assumed that there are 32 cross polarization antennas, and that there are 16 antennas in each polarization direction. A base station may form 16 beams by using a manner of antenna weighting. As shown in FIG. 3, the 16 beams may be represented as beams 0 to 15. Each beam may correspond to 2 ports, and then 16 beams correspond to 32 ports.

The base station may receive an uplink sounding signal of UE separately by using the 32 ports, and determine an average uplink receive power of each of the beams 0 to 15 according to the uplink sounding signal of the UE. For a specific process, reference may be made to the process of the embodiment in FIG. 1.

Then, the base station may compare the average uplink receive powers of the beams 0 to 15, so as to select a beam with the greatest average uplink receive power as a beam for sending pilot signals.

For example, it is assumed that an average uplink receive power of the beam 2 is the greatest, descriptions are made below by using the beam 2 as an example.

Before sending the pilot signals, the base station may send high-layer signaling to the UE, to indicate, to the UE, a pilot signal configuration corresponding to the beam 2, and a start time and a transmission interval for sending the pilot signals. In this way, the UE may measure, according to the start time and the transmission interval, the pilot signals on time-frequency resources indicated by the pilot signal configuration corresponding to the beam 2, to obtain measurement information, and report the measurement information to the base station.

The base station may use the beam 2 as a data transmission beam corresponding to the UE, and send data to the UE according to the measurement information by using the beam 2.

Based on an existing pilot design solution, the base station needs to send the pilot signals to the UE by using 32 ports, resulting in both poor flexibility of configuring the pilot signals by the base station for the UE and high complexity of measuring the pilot signals by the UE. However, in the embodiment of the present disclosure, the base station may select one beam from the 16 beams to send the pilot signals, that is, select 2 ports from the 32 ports to send the pilot signals, thereby improving the flexibility of configuring the pilot signals for the UE, and reducing the complexity of measuring the pilot signals by the UE.

In addition, the existing pilot design solution does not support 32 ports. However, in the embodiment of the present disclosure, the base station may select one beam from the 16 beams to send the pilot signals, that is, select 2 ports from the 32 ports to send the pilot signals. In this way, a pilot pattern and a codebook supported by a protocol still can be used, and pilot signal transmission in a large-scale antenna system can be implemented.

Figure 4:
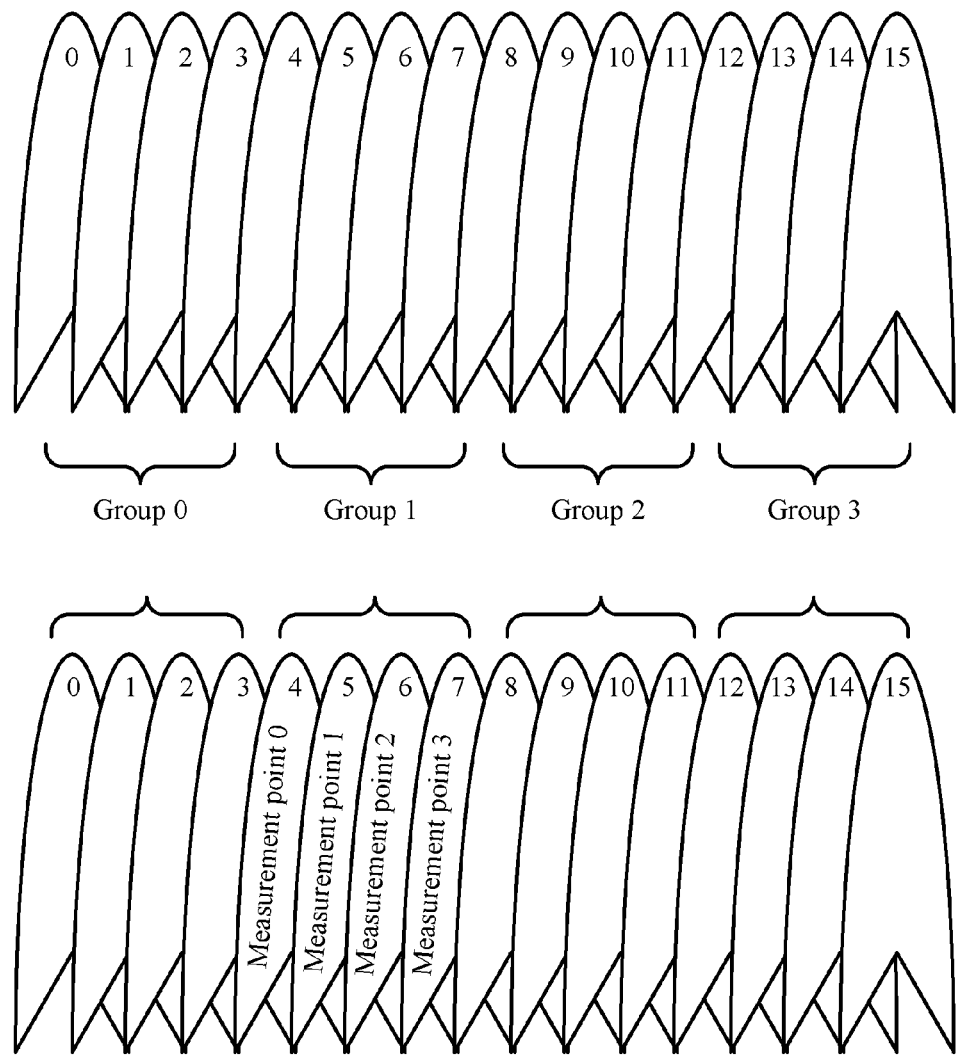
FIG. 4 is a schematic diagram of another example of a scenario to which an embodiment of the present disclosure is applicable.

FIG. 4 is a schematic diagram of another example of a scenario to which an embodiment of the present disclosure is applicable.

In FIG. 4, it is still assumed that there are 32 cross polarization antennas, and that there are 16 antennas in each polarization direction. A base station may form 16 beams by using a manner of antenna weighting. As shown in FIG. 4, the 16 beams may be represented as beams 0 to 15. Each beam may correspond to 2 ports, and then 16 beams correspond to 32 ports.

The base station may group the 16 beams into 4 groups with every 4 adjacent beams as one group. As shown in FIG. 4, the 4 groups may be represented as a group 0, a group 1, a group 2, and a group 3 respectively.

The base station may receive an uplink sounding signal of UE separately by using the 32 ports, and determine an average uplink receive power of each of the beams 0 to 15 according to the uplink sounding signal of the UE. For a specific process, reference may be made to the process of the embodiment in FIG. 1.

Then, the base station may separately calculate a sum of average uplink receive powers of beams in each group of beams. For example, average uplink receive powers of the beams 0 to 3 are added together to obtain a sum of average uplink receive powers of the group 0.

The base station may compare sums of average uplink receive powers of the groups 0 to 3, select a group with the greatest sum of average uplink receive powers, and then send pilot signals to the UE by using the beams in this group.

It is assumed that a sum of average uplink receive powers of the group 2 is the greatest. Descriptions will be made below by using the group 2 as an example.

In order to distinguish the beams, pilot signal configurations corresponding to the beams are different from each other. That is, pilot signal configurations corresponding to beams in a same group are different. Pilot signal configurations corresponding to beams in different groups are also different. That is, 16 beams correspond to 16 types of pilot signal configurations. Therefore, beams 4 to 7 separately correspond to 4 types of pilot signal configurations. That is, the base station may send 4 types of pilot signals to the UE by using the beams 4 to 7 and using 4 types of pilot signal configurations. It may also be understood as that, the base station sends 4 types of pilot signals to the UE by using 8 ports in the group 2, and 2 ports corresponding to each beam correspond to one type of pilot signal configuration.

Before sending the pilot signals, the base station may send high-layer signaling to the UE, to indicate, to the UE, the 4 types of pilot signal configurations separately corresponding to the beams 4 to 7 and a start time and a transmission interval for sending the pilot signals.

The UE may measure, according to the start time and the transmission interval, the pilot signals on time-frequency resources separately indicated by the 4 types of pilot signal configurations. It is assumed that the time-frequency resources separately indicated by the 4 types of pilot signal configurations are referred to as 4 measurement points, that is, a measurement point 0, a measurement point 1, a measurement point 2, and a measurement point 3. The measurement point 0 corresponds to the beam 4, the measurement point 1 corresponds to the beam 5, the measurement point 2 corresponds to the beam 6, and the measurement point 4 corresponds to the beam 7. Herein, the measurement points also correspond to the same start time and transmission interval.

The UE measures, separately on the 4 measurement points, the 4 types of pilot signals that are sent by using the beams 4 to 7, to obtain 4 measurement results, and reports the measurement results to the base station.

The base station may obtain, according to the 4 measurement results, spectral efficiencies corresponding to the 4 measurement results. The base station compares the spectral efficiencies corresponding to the 4 measurement results, and selects a measurement result with the greatest spectral efficiency. The base station may determine a beam corresponding to the selected measurement result. For example, it is assumed that a spectral efficiency corresponding to the measurement result obtained at the measurement point 1 is the greatest, and then the beam corresponding to the measurement result is the beam 5. Then, the base station may send data to the UE by using the beam 5.

Based on an existing pilot design solution, the base station needs to send the pilot signals to the UE by using 32 ports, resulting in both poor flexibility of configuring the pilot signals by the base station for the UE and high complexity of measuring the pilot signals by the UE. However, in the embodiment of the present disclosure, the base station may select a part of beams from the 16 beams to send the pilot signals, that is, select a part of ports from the 32 ports to send the pilot signals, thereby improving the flexibility of configuring the pilot signals for the UE, and reducing the complexity of measuring the pilot signals by the UE.

In addition, the existing pilot design solution does not support 32 ports. However, in the embodiment of the present disclosure, the base station may select one beam from the 16 beams to send the pilot signals, that is, select 2 ports from the 32 ports to send the pilot signals. In this way, a pilot pattern and a codebook supported by a protocol still can be used, and pilot signal transmission in a large-scale antenna system can be implemented.

Figure 5:
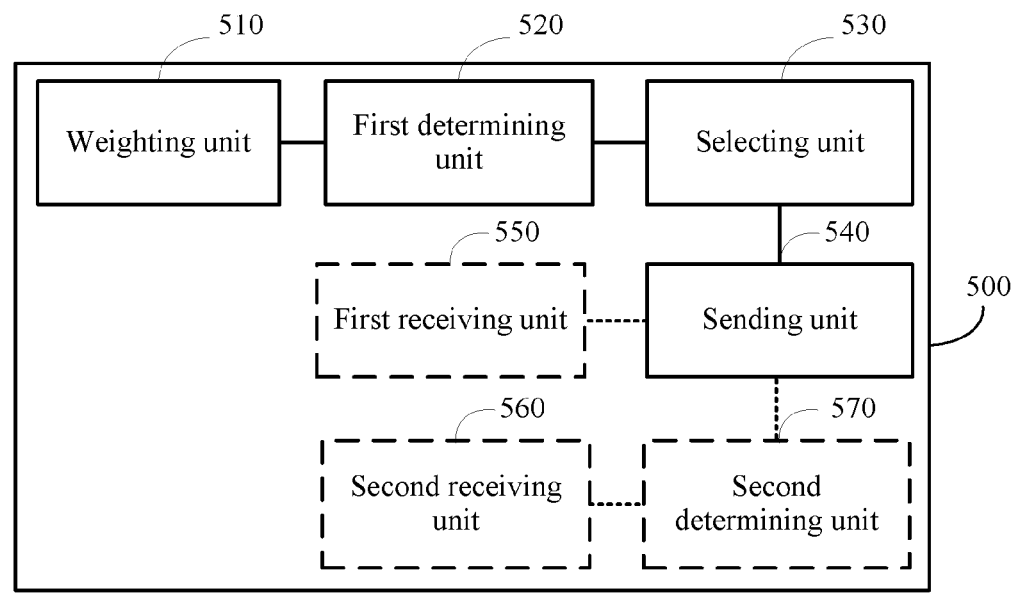
FIG. 5 is a schematic block diagram of a base station according to an embodiment of the present disclosure.

FIG. 5 is a schematic block diagram of a base station according to an embodiment of the present disclosure. The base station 500 in FIG. 5 includes a weighting unit 510, a first determining unit 520, a selecting unit 530, and a sending unit 540.

The weighting unit 510 forms m beams by using a manner of antenna weighting, where m is a positive integer greater than 1. The first determining unit 520 determines an uplink receive power of each beam in the m beams according to an uplink sounding signal of user equipment (UE). The selecting unit 530 selects n beams from the m beams according to the uplink receive power of each beam in the m beams, where n is a positive integer, and n<m. The sending unit 540 sends pilot signals to the UE by using the n beams.

In the embodiment of the present disclosure, an uplink receive power of each beam in m beams is determined according to an uplink sounding signal of UE, and n beams are selected from the m beams according to the uplink receive power of each beam in the m beams, to send pilot signals to the UE, instead of sending the pilot signals to the UE by using all the beams, thereby improving the flexibility of configuring the pilot signals for the UE, and reducing the complexity of measuring the pilot signals by the UE.

Optionally, as an embodiment, the selecting unit 530 may select an optimal beam from the m beams, where an uplink receive power of the optimal beam is the greatest one in the m beams. The sending unit 540 may send the pilot signals to the UE by using the optimal beam.

Optionally, as another embodiment, before sending the pilot signals to the UE by using the optimal beam, the sending unit 540 may further send first signaling to the UE, where the first signaling is used to indicate a pilot signal configuration corresponding to the optimal beam, and a start time and a transmission interval for sending the pilot signals, and the pilot signal configuration is used to indicate time-frequency resources occupied by the pilot signals.

Optionally, as another embodiment, the base station 500 may further include a first receiving unit 550. The first receiving unit 550 receives first measurement information from the UE after the sending unit 540 sends the pilot signals to the UE by using the optimal beam, where the first measurement information is obtained by the UE after the UE measures the pilot signals according to the first signaling. The sending unit 540 may further send data to the UE according to the first measurement information by using the optimal beam.

Optionally, as another embodiment, the first measurement information may include a CQI. Alternatively, the first measurement information may include the CQI and at least one of the following: a rank and a PMI.

Optionally, as another embodiment, the selecting unit 530 may determine a sum of uplink receive powers of beams in each of q groups of beams according to the uplink receive power of each beam in the m beams, where the q groups of beams are obtained by grouping the m beams, and each group of beams includes n beams, and then, may select a group of beams from the q groups of beams, where a sum of uplink receive powers of beams in the selected group of beams is the greatest one in the q groups of beams.

Optionally, as another embodiment, n beams in the selected group of beams may be in a one-to-one correspondence to n types of pilot signal configurations, and the pilot signal configurations are separately used for time-frequency resources occupied by the pilot signals. The sending unit 540 may send the pilot signals to the UE separately according to the n types of pilot signal configurations by using the n beams in the selected group of beams.

Optionally, as another embodiment, before sending the pilot signals to the UE separately according to the n types of pilot signal configurations by using the n beams in the selected group of beams, the sending unit 540 may further send second signaling to the UE, where the second signaling is used to indicate the n types of pilot signal configurations, and a start time and a transmission interval for sending the pilot signals.

Optionally, as another embodiment, the base station 500 may further include a second receiving unit 560 and a second determining unit 570. After the sending unit 540 sends the pilot signals to the UE separately according to the n types of pilot signal configurations by using the n beams in the selected group of beams, the second receiving unit 560 may receive second measurement information from the UE, where the second measurement information includes n measurement results obtained by the UE after the UE measures the pilot signals according to the second signaling. The second determining unit 570 may further determine, according to the selected group of beams and the second measurement information, a data transmission beam corresponding to the UE. The sending unit 540 may further send data to the UE by using the data transmission beam.

Optionally, as another embodiment, the second determining unit 570 may determine spectral efficiencies separately corresponding to the n measurement results, and may determine an optimal measurement result in the n measurement results according to the spectral efficiencies separately corresponding to the n measurement results, where a spectral efficiency corresponding to the optimal measurement result is the greatest one in the n measurement results. Then, the second determining unit 570 may determine the data transmission beam according to the optimal measurement result and the selected group of beams.

Optionally, as another embodiment, each measurement result in the n measurement results may include a CQI. Alternatively, each measurement result may include the CQI and at least one of the following: a rank and a PMI.

Optionally, as an embodiment, the foregoing pilot signals may be CSI-RSs.

For other functions and operations of the base station 500 in FIG. 5, reference may be made to the process related to the base station in the foregoing method embodiments in FIG. 1 to FIG. 4. To avoid repetition, details are not described herein again.

Figure 6:
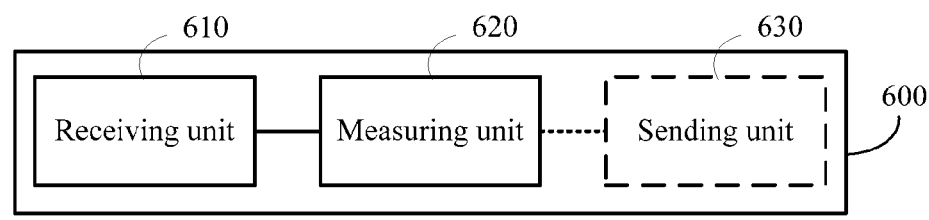
FIG. 6 is a schematic block diagram of UE according to an embodiment of the present disclosure.

FIG. 6 is a schematic block diagram of UE according to an embodiment of the present disclosure. The UE 600 in FIG. 6 includes a receiving unit 610 and a measuring unit 620.

The receiving unit 610 receives pilot signals that are sent by a base station by using n beams, where the n beams are selected by the base station from m formed beams according to an uplink receive power of each beam in the m beams, m is a positive integer greater than 1, n is a positive integer, and n<m. The measuring unit 620 measures the pilot signals.

In the embodiment of the present disclosure, pilot signals that are sent by a base station by using n beams are measured, and the n beams are selected from m beams, thereby reducing the measurement complexity. Further, the base station sends the pilot signals by using the n beams in the m beams, which can improve the flexibility of configuring the pilot signals for UE.

Optionally, as another embodiment, the receiving unit 610 may receive the pilot signals that are sent by the base station by using an optimal beam, where an uplink receive power of the optimal beam is the greatest one in the m beams.

Optionally, as another embodiment, before receiving the pilot signals that are sent by the base station by using the optimal beam, the receiving unit 610 may further receive first signaling sent by the base station, where the first signaling is used to indicate a pilot signal configuration corresponding to the optimal beam, and a start time and a transmission interval for sending the pilot signals, and the pilot signal configuration is used to indicate time-frequency resources occupied by the pilot signals. The measuring unit 620 may measure the pilot signals according to the first signaling, to obtain first measurement information.

Optionally, as another embodiment, the UE 600 may further include a sending unit 630.

The sending unit 630 may send the first measurement information to the base station. The receiving unit 610 may further receive data that is sent by the base station according to the first measurement information by using the optimal beam.

Optionally, as another embodiment, the first measurement information may include a CQI. Alternatively, the first measurement information may include the CQI and at least one of the following: a rank and a PMI.

Optionally, as another embodiment, the receiving unit 610 may receive the pilot signals that are sent by the base station separately by using n beams in a group of beams, where the group of beams is selected from q groups of beams that are obtained by the base station by grouping the m beams, each group of beams includes n beams, and a sum of uplink receive powers of beams in the group of beams is the greatest one in the q groups of beams.

Optionally, as another embodiment, n beams in the group of beams are in a one-to-one correspondence to n types of pilot signal configurations, and the pilot signal configurations are used to indicate time-frequency resources occupied by the pilot signals. The receiving unit 610 may receive the pilot signals that are sent by the base station separately according to the n types of pilot configurations by using the n beams in the group of beams.

Optionally, as another embodiment, before receiving the pilot signals that are sent by the base station separately according to the n types of pilot configurations by using the n beams in the group of beams, the receiving unit 610 may further receive second signaling sent by the base station, where the second signaling is used to indicate the n types of pilot signal configurations, and a start time and a transmission interval for sending the pilot signals.

The measuring unit 620 may measure the pilot signals according to the second signaling, to obtain n measurement results.

Optionally, as another embodiment, the sending unit 630 may send second measurement information to the base station, where the second measurement information includes the n measurement results. The receiving unit 610 may further receive data that is sent by the base station by using a data transmission beam, where the data transmission beam is determined by the base station according to the group of beams and the second measurement information.

Optionally, as another embodiment, each measurement result in the n measurement results may include a CQI. Alternatively, each measurement result may include the CQI and at least one of the following: a rank and a PMI.

Optionally, as an embodiment, the foregoing pilot signals may be CSI-RSs.

For other functions and operations of the UE 600 in FIG. 6, reference may be made to the process related to the UE in the foregoing method embodiments in FIG. 1 to FIG. 4. To avoid repetition, details are not described herein again.

Figure 7:
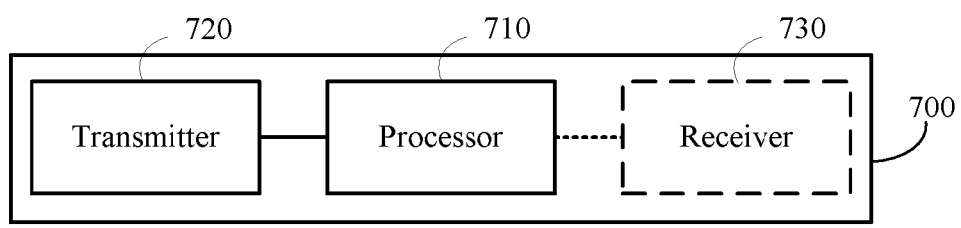
FIG. 7 is a schematic block diagram of a base station according to another embodiment of the present disclosure.

FIG. 7 is a schematic block diagram of a base station according to another embodiment of the present disclosure. The base station 700 in FIG. 7 includes a processor 710 and a transmitter 720.

The processor 710 forms m beams by using a manner of antenna weighting, where m is a positive integer greater than 1. The processor 710 further determines an uplink receive power of each beam in the m beams according to an uplink sounding signal of user equipment (UE). The processor 710 further selects n beams from the m beams according to the uplink receive power of each beam in the m beams, where n is a positive integer, and n<m. The transmitter 720 sends pilot signals to the UE by using the n beams.

In the embodiment of the present disclosure, an uplink receive power of each beam in m beams is determined according to an uplink sounding signal of UE, and n beams are selected from the m beams according to the uplink receive power of each beam in the m beams, to send pilot signals to the UE, instead of sending the pilot signals to the UE by using all the beams, thereby improving the flexibility of configuring the pilot signals for the UE, and reducing the complexity of measuring the pilot signals by the UE.

Optionally, as an embodiment, the processor 710 may select an optimal beam from the m beams, where an uplink receive power of the optimal beam is the greatest one in the m beams. The transmitter 720 may send the pilot signals to the UE by using the optimal beam.

Optionally, as another embodiment, before sending the pilot signals to the UE by using the optimal beam, the transmitter 720 may further send first signaling to the UE, where the first signaling is used to indicate a pilot signal configuration corresponding to the optimal beam, and a start time and a transmission interval for sending the pilot signals, and the pilot signal configuration is used to indicate time-frequency resources occupied by the pilot signals.

Optionally, as another embodiment, the base station 700 may further include a receiver 730. The receiver 730 receives first measurement information from the UE after the transmitter 720 sends the pilot signals to the UE by using the optimal beam, where the first measurement information is obtained by the UE after the UE measures the pilot signals according to the first signaling. The transmitter 720 may further send data to the UE according to the first measurement information by using the optimal beam.

Optionally, as another embodiment, the first measurement information may include a CQI. Alternatively, the first measurement information may include the CQI and at least one of the following: a rank and a PMI.

Optionally, as another embodiment, the processor 710 may determine a sum of uplink receive powers of beams in each of q groups of beams according to the uplink receive power of each beam in the m beams, where the q groups of beams are obtained by grouping the m beams, and each group of beams includes n beams, and then, may select a group of beams from the q groups of beams, where a sum of uplink receive powers of beams in the selected group of beams is the greatest one in the q groups of beams.

Optionally, as another embodiment, n beams in the selected group of beams may be in a one-to-one correspondence to n types of pilot signal configurations, and the pilot signal configurations are separately used for time-frequency resources occupied by the pilot signals. The transmitter 720 may send the pilot signals to the UE separately according to the n types of pilot signal configurations by using the n beams in the selected group of beams.

Optionally, as another embodiment, before sending the pilot signals to the UE separately according to the n types of pilot signal configurations by using the n beams in the selected group of beams, the transmitter 720 may further send second signaling to the UE, where the second signaling is used to indicate the n types of pilot signal configurations, and a start time and a transmission interval for sending the pilot signals.

Optionally, as another embodiment, after the transmitter 720 sends the pilot signals to the UE separately according to the n types of pilot signal configurations by using the n beams in the selected group of beams, the receiver 730 may receive second measurement information from the UE, where the second measurement information includes n measurement results obtained by the UE after the UE measures the pilot signals according to the second signaling. The processor 710 may further determine, according to the selected group of beams and the second measurement information, a data transmission beam corresponding to the UE. The transmitter 720 may further send data to the UE by using the data transmission beam.

Optionally, as another embodiment, the processor 710 may determine spectral efficiencies separately corresponding to the n measurement results, and may determine an optimal measurement result in the n measurement results according to the spectral efficiencies separately corresponding to the n measurement results, where a spectral efficiency corresponding to the optimal measurement result is the greatest one in the n measurement results. Then, the processor 710 may determine the data transmission beam according to the optimal measurement result and the selected group of beams.

Optionally, as another embodiment, each measurement result in the n measurement results may include a CQI. Alternatively, each measurement result may include the CQI and at least one of the following: a rank and a PMI.

Optionally, as an embodiment, the foregoing pilot signals may be CSI-RSs.

For other functions and operations of the base station 700 in FIG. 7, reference may be made to the process related to the base station in the foregoing method embodiments in FIG. 1 to FIG. 4. To avoid repetition, details are not described herein again.

Figure 8:
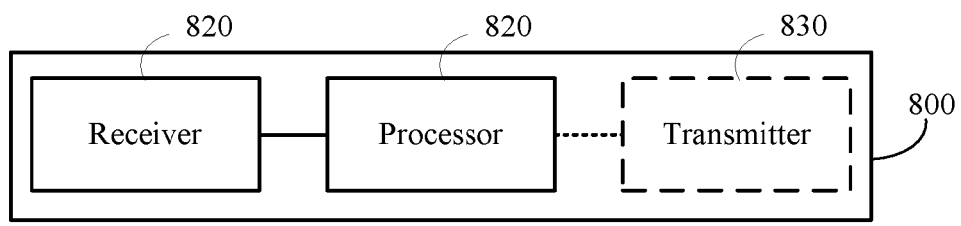
FIG. 8 is a schematic block diagram of UE according to another embodiment of the present disclosure.

FIG. 8 is a schematic block diagram of UE according to another embodiment of the present disclosure. The UE 800 in FIG. 8 includes a receiver 810 and a processor 820.

The receiver 810 receives pilot signals that are sent by a base station by using n beams, where the n beams are selected by the base station from m formed beams according to an uplink receive power of each beam in the m beams, m is a positive integer greater than 1, n is a positive integer, and n<m. The processor 820 measures the pilot signals.

In the embodiment of the present disclosure, pilot signals that are sent by a base station by using n beams are measured, and the n beams are selected from m beams, thereby reducing the measurement complexity. Further, the base station sends the pilot signals by using the n beams in the m beams, which can improve the flexibility of configuring the pilot signals for UE.

Optionally, as an embodiment, the receiver 810 may receive the pilot signals that are sent by the base station by using an optimal beam, where an uplink receive power of the optimal beam is the greatest one in the m beams.

Optionally, as another embodiment, before receiving the pilot signals that are sent by the base station by using the optimal beam, the receiver 810 may further receive first signaling sent by the base station, where the first signaling is used to indicate a pilot signal configuration corresponding to the optimal beam, and a start time and a transmission interval for sending the pilot signals, and the pilot signal configuration is used to indicate time-frequency resources occupied by the pilot signals. The processor 820 may measure the pilot signals according to the first signaling, to obtain first measurement information.

Optionally, as another embodiment, the UE 800 may further include a transmitter 830.

The transmitter 830 may send the first measurement information to the base station. The receiver 810 may further receive data that is sent by the base station according to the first measurement information by using the optimal beam.

Optionally, as another embodiment, the first measurement information may include a CQI. Alternatively, the first measurement information may include the CQI and at least one of the following: a rank and a PMI.

Optionally, as another embodiment, the receiver 810 may receive the pilot signals that are sent by the base station separately by using n beams in a group of beams, where the group of beams is selected from q groups of beams that are obtained by the base station by grouping the m beams, each group of beams includes n beams, and a sum of uplink receive powers of beams in the group of beams is the greatest one in the q groups of beams.

Optionally, as another embodiment, n beams in the group of beams are in a one-to-one correspondence to n types of pilot signal configurations, and the pilot signal configurations are used to indicate time-frequency resources occupied by the pilot signals. The receiver 810 may receive the pilot signals that are sent by the base station separately according to the n types of pilot configurations by using the n beams in the group of beams.

Optionally, as another embodiment, before receiving the pilot signals that are sent by the base station separately according to the n types of pilot configurations by using the n beams in the group of beams, the receiver 810 may further receive second signaling sent by the base station, where the second signaling is used to indicate the n types of pilot signal configurations, and a start time and a transmission interval for sending the pilot signals.

The receiver 810 may measure the pilot signals according to the second signaling, to obtain n measurement results.

Optionally, as another embodiment, the receiver 810 may send second measurement information to the base station, where the second measurement information includes the n measurement results. The receiver 810 may further receive data that is sent by the base station by using a data transmission beam, where the data transmission beam is determined by the base station according to the group of beams and the second measurement information.

Optionally, as another embodiment, each measurement result in the n measurement results may include a CQI. Alternatively, each measurement result may include the CQI and at least one of the following: a rank and a PMI.

Optionally, as an embodiment, the foregoing pilot signals may be CSI-RSs.

For other functions and operations of the UE 800 in FIG. 8, reference may be made to the process related to the UE in the foregoing method embodiments in FIG. 1 to FIG. 4. To avoid repetition, details are not described herein again.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of the present disclosure.

It may be clearly understood by a person skilled in the art that, for the purpose of convenient and brief description, for a detailed working process of the foregoing system, apparatus, and unit, reference may be made to a corresponding process in the foregoing method embodiments, and details are not described herein again.

In the several embodiments provided in the present application, it should be understood that the disclosed system, apparatus, and method may be implemented in other manners. For example, the described apparatus embodiment is merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. A part or all of the units may be selected as required to achieve the objectives of the solutions of the embodiments.

In addition, functional units in the embodiments of the present disclosure may be integrated into one processing unit, or each of the units may exist alone physically, or two or more units may be integrated into one unit.

When the functions are implemented in a form of a software functional unit and sold or used as an independent product, the functions may be stored in a computer-readable storage medium. Based on such an understanding, the technical solutions of the present disclosure essentially, or the part contributing to the prior art, or a part of the technical solutions may be implemented in a form of a software product. The computer software product is stored in a storage medium, and includes several instructions for instructing a computer device (which may be a personal computer, a server, a network device, or the like) to perform all or a part of the steps of the methods described in the embodiments of the present disclosure. The foregoing storage medium includes: any medium that can store program code, such as a USB flash drive, a removable hard disk, a read-only memory (ROM), a random access memory (RAM), a magnetic disk, or an optical disc.

The foregoing descriptions are merely specific implementation manners of the present disclosure, but are not intended to limit the protection scope of the present disclosure. Any variation or replacement readily figured out by a person skilled in the art within the technical scope disclosed in the present application shall fall within the protection scope of the present disclosure. Therefore, the protection scope of the present disclosure shall be subject to the protection scope of the claims.

What is claimed is:

1. A communication method comprising:
forming, by a base station, m beams by using a manner of antenna weighting, wherein m is a positive integer greater than 1;

determining, by the base station, an uplink receive power of each beam in the m beams according to an uplink sounding signal of user equipment (UE);

selecting, by the base station, n beams from the m beams according to the uplink receive power of each beam in the m beams, wherein n is a positive integer, and n<m wherein selecting the n beams includes:

determining a sum of uplink receive powers of beams in each of q groups of beams according to the uplink receive power of each beam in the m beams, wherein the q groups of beams are obtained by grouping the m beams, and each group of beams comprises n beams; and selecting a group of beams from the q groups of beams, wherein a sum of uplink receive powers of beams in the selected group of beams is the greatest one in the q groups of beams; and sending, by the base station, pilot signals to the UE by using the n beams.

2. The method according to claim 1, wherein n beams in the selected group of beams are in a one-to-one correspondence to n types of pilot signal configurations, and the pilot signal configurations are separately used to indicate time-frequency resources occupied by the pilot signals; and the sending pilot signals to the UE comprises:

sending the pilot signals to the UE separately according to the n types of pilot signal configurations by using the n beams in the selected group of beams.

3. The method according to claim 2, before sending the pilot signals to the UE, the method further comprising:

sending, by the base station, second signaling to the UE, wherein the second signaling is used to indicate the n types of pilot signal configurations, and a start time and a transmission interval for sending the pilot signals.

4. The method according to claim 3, after the sending the pilot signals to the UE, the method further comprising:

receiving, by the base station, second measurement information from the UE, wherein the second measurement information comprises n measurement results obtained by the UE after the UE measures the pilot signals according to the second signaling;

determining, by the base station according to the selected group of beams and the second measurement information, a data transmission beam corresponding to the UE; and sending, by the base station, data to the UE by using the data transmission beam.

5. The method according to claim 4, wherein the determining the data transmission beam corresponding to the UE comprises:

determining spectral efficiencies separately corresponding to the n measurement results;

determining an optimal measurement result in the n measurement results according to the spectral efficiencies separately corresponding to the n measurement results, wherein a spectral efficiency corresponding to the optimal measurement result is the greatest one in the n measurement results; and determining the data transmission beam according to the optimal measurement result and the selected group of beams.

6. A base station comprising:

a processor and storage medium containing executable instruction that, when executed by the processor, configure the processor to provide the following:

form m beams by using a manner of antenna weighting, wherein m is a positive integer greater than 1, determine an uplink receive power of each beam in the m beams according to an uplink sounding signal of user equipment (UE), and select n beams from the m beams according to the uplink receive power of each beam in the m beams, wherein n is a positive integer, and n<m, wherein selecting the n beams by the processor includes:

determining a sum of uplink receive powers of beams in each of q groups of beams according to the uplink receive power of each beam in the m beams, wherein the q groups of beams are obtained by grouping the m beams, and each group of beams comprises n beams;

selecting a group of beams from the q groups of beams, wherein a sum of uplink receive powers of beams in the selected group of beams is the greatest one in the q groups of beams; and a transmitter configured to send pilot signals to the UE by using the n beams.

7. The base station according to claim 6, wherein n beams in the selected group of beams are in a one-to-one correspondence to n types of pilot signal configurations, and the pilot signal configurations are separately used to indicate time-frequency resources occupied by the pilot signals; and the transmitter is further configured to cooperate with the processor to send the pilot signals to the UE separately according to the n types of pilot signal configurations by using the n beams in the selected group of beams.

8. The base station according to claim 7, wherein the transmitter is further configured to: before sending the pilot signals to the UE cooperate with the processor to send second signaling to the UE, wherein the second signaling is used to indicate the n types of pilot signal configurations, and a start time and a transmission interval for sending the pilot signals.

9. The base station according to claim 8, wherein the receiver is further configured to: after the transmitter sends the pilot signals to the UE, cooperate with the processor to receive second measurement information from the UE, wherein the second measurement information comprises n measurement results obtained by the UE after the UE measures the pilot signals according to the second signaling;

the processor is further configured to determine, according to the selected group of beams and the second measurement information, a data transmission beam corresponding to the UE; and the transmitter is further configured to cooperate with the processor to send data to the UE by using the data transmission beam.

10. The base station according to claim 9, wherein the processor is further configured to:

determine spectral efficiencies separately corresponding to the n measurement results;

determine an optimal measurement result in the n measurement results according to the spectral efficiencies separately corresponding to the n measurement results, wherein a spectral efficiency corresponding to the optimal measurement result is the greatest one in the n measurement results; and determine the data transmission beam according to the optimal measurement result and the selected group of beams.

11. A user equipment comprising:

a processor in communication with a storage medium containing executable instructions that, when executed, configure the processor to measure pilot signals separately sent from a base station; and a receiver configured to cooperate with the processor to receive the pilot signals sent by a base station, wherein the pilot signals are separately sent by using a group of n beams selected by the base station from m formed beams according to an uplink receive power of each beam in the m beams, where the group of n beams is selected from q groups of beams obtained by the base station by grouping the m formed beams, and a sum of uplink receive powers of beams in the group of n beams is the greatest one in the q groups of beams, where m is a positive integer greater than 1, n is a positive integer, and n<m.

12. The user equipment according to claim 11, wherein n beams in the group of beams are in a one-to-one correspondence to n types of pilot signal configurations, and the pilot signal configurations are used to indicate time-frequency resources occupied by the pilot signals; and the receiver is further configured to cooperate with the processor to receive the pilot signals that are sent by the base station separately according to the n types of pilot configurations by using the n beams in the group of beams.

13. The user equipment according to claim 12, wherein the receiver is further configured to cooperate with the processor to: before receiving the pilot signals, receive second signaling sent by the base station, wherein the second signaling is used to indicate the n types of pilot signal configurations, a start time and a transmission interval for sending the pilot signals; and the processor is further configured to measure the pilot signals according to the second signaling, to obtain n measurement results.

14. The user equipment according to claim 13, wherein the transmitter is further configured to cooperate with the processor to send second measurement information to the base station, wherein the second measurement information comprises the n measurement results; and the receiver is further configured to cooperate with the processor to receive data that is sent by the base station by using a data transmission beam, wherein the data transmission beam is determined by the base station according to the group of beams and the second measurement information.

* * * * *